Nov. 18, 1924.
J. E. BROWNFIELD
1,515,829
PISTON AND RING THEREFOR
Filed Feb. 28, 1922
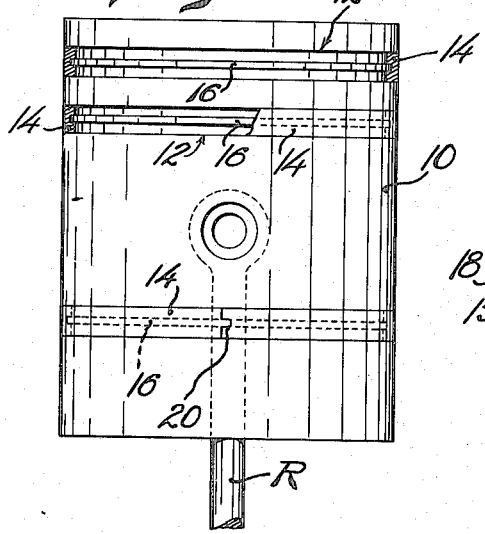
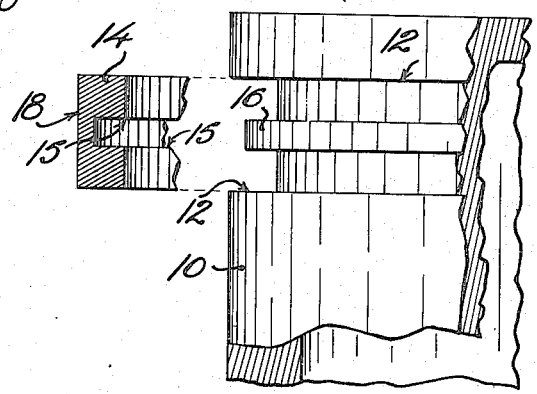
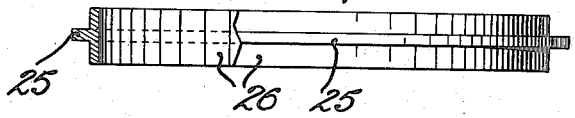
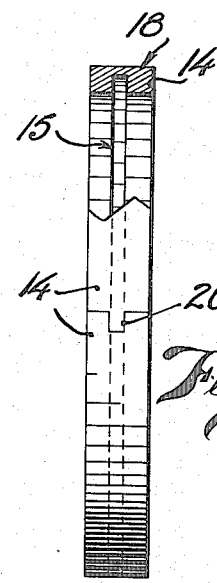
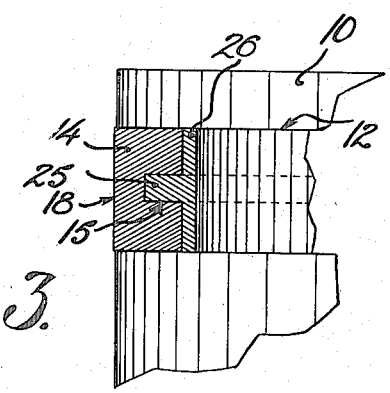
Inventor
J. E. Brownfield.
By Lynn L. Steele
Attorney.

Patented Nov. 18, 1924.

1,515,829

UNITED STATES PATENT OFFICE.

JOHN E. BROWNFIELD, OF DENVER, COLORADO.

PISTON AND RING THEREFOR.

Application filed February 28, 1922. Serial No. 539,975.

*To all whom it may concern:*

Be it known that I, JOHN E. BROWNFIELD, a citizen of the United States, and resident of the city and county of Denver, State of Colorado, have invented certain new and useful Improvements in Pistons and Rings Therefor; and I do declare the following to be a full, clear, and exact description of the invention, such as will enable others skilled in the art to which it appertains to make and use the same, reference being had to the accompanying drawings, which form a part of this specification.

The object of this invention is to provide a piston ring construction for explosive engines and the like which will insure an unusually tight joint and thereby greatly increase the power of engines upon which the invention is used.

This object is attained by means of a tongue and groove connection between the ring and the piston, one of the parts carrying the tongue and the other being provided with the groove, the faces of the tongue being at all times in contact with those of the groove, all faces being parallel and in planes perpendicular to the axis of the piston.

In the drawings wherein certain embodiments of the invention are disclosed,

Fig. 1 is an elevation of a piston embodying the present invention, parts of the rings being broken away;

Fig. 2 is an enlarged elevational and sectional detail thereof;

Fig. 3 is a detail partially in elevation and partially in section showing a secondary ring for installing the improvement on old style pistons;

Fig. 4 is an elevation of said secondary ring;

Fig. 5 is an elevation of the outer or primary ring which is used on all forms and engages the cylinder walls.

The invention is shown as applied to a standard explosive engine piston 10 which is operable in the usual way by means of a connecting rod R and has ring grooves 12. The rings 14 are resilient as usual but have their inner faces provided with grooves 15 which are adapted to receive tongues 16 carried by the piston at the bottoms of the grooves 12, the outer faces 18 of the rings bearing against the cylinder walls as heretofore.

The opposite faces of the grooves 15 and of the tongues 16 are all parallel, and all these faces lie in planes perpendicular to the longitudinal axis of the piston. The faces of the grooves 15 are always in contact with the faces of the tongues 16, the proportions of these parts being sufficient to insure such engagement when the rings are in any position of expansion during operation. Any desired type of joint for the rings may be employed such as that indicated at 20.

Where the invention is to be applied to an old style piston, an auxiliary ring 26 is provided which carries a tongue 25, like tongue 16, for engagement in the ring groove 15. The auxiliary or secondary ring 26 is snugly fitted into the bottom of the piston groove 12 so as to make a tight connection therewith, while the ring 14 has its usual operating fit in said groove 12 and about the tongue 25. By thus employing the resilient primary ring 14 and the secondary tightly fitting ring 26, the invention is easily adapted to an old piston.

In either form the two joints between the faces of the groove 15 and the faces of the tongue 16 or 25 are provided in addition to the joints between the edges of the ring 14 and the walls of the piston groove 12. This prevents any gas which has passed around the upper edge of ring 14 from traveling direct to the lower edge thereof while behind the ring and within the groove 12. In order for such gas to travel behind the ring it must also pass around the tongue and through the ring groove 15, but the joints at this point effectually prevent such travel. The result is a great saving in compression and a corresponding increase in power. At the same time, the construction almost entirely eliminates oil pumping in cylinders which heretofore have been very bad in that respect.

I claim:

In combination, a piston having a groove, a piston ring movable in said groove, and an auxiliary ring rigidly seated within said groove and cooperating with the first mentioned groove, one of said rings having a groove and a tongue on the other ring to be received in the second mentioned groove.

In testimony whereof I affix my signature.

JOHN E. BROWNFIELD.